US008261279B2

(12) United States Patent
Accapadi et al.

(10) Patent No.: US 8,261,279 B2
(45) Date of Patent: Sep. 4, 2012

(54) OPTIMIZED PREEMPTION AND RESERVATION OF SOFTWARE LOCKS FOR WOKEN THREADS

(75) Inventors: Jos Manuel Accapadi, Austin, TX (US); Matthew Accapadi, Austin, TX (US); Andrew Dunshea, Austin, TX (US); Dirk Michel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1208 days.

(21) Appl. No.: 12/049,304

(22) Filed: Mar. 15, 2008

(65) Prior Publication Data

US 2008/0163217 A1    Jul. 3, 2008

Related U.S. Application Data

(63) Continuation of application No. 11/301,104, filed on Dec. 12, 2005, now abandoned.

(51) Int. Cl.
*G06F 9/46* (2006.01)
(52) U.S. Cl. ........................................................ 718/104
(58) Field of Classification Search .................. 718/103, 718/104
See application file for complete search history.

(56) References Cited

U.S. PATENT DOCUMENTS

| 5,297,283 | A | 3/1994 | Kelly et al. | 718/104 |
| 5,961,583 | A | 10/1999 | Van Fleet | 709/102 |
| 6,910,212 | B2 * | 6/2005 | Brenner et al. | 718/104 |
| 7,380,247 | B2 | 5/2008 | Accapadi | 718/103 |
| 7,383,368 | B2 | 6/2008 | Schopp | 710/200 |
| 7,752,620 | B2 | 7/2010 | Accapadi | 718/1 |
| 7,984,439 | B2 * | 7/2011 | McConnell | 718/100 |
| 2002/0078119 | A1 | 6/2002 | Brenner et al. | 709/102 |
| 2002/0078123 | A1 | 6/2002 | Latour | 709/104 |
| 2002/0083063 | A1 | 6/2002 | Egolf | 707/100 |
| 2004/0019892 | A1 | 1/2004 | E. et al. | 718/107 |
| 2004/0216112 | A1 | 10/2004 | Accapadi et al. | 718/103 |
| 2006/0265373 | A1 | 11/2006 | McKenney et al. | 707/8 |
| 2007/0094430 | A1 * | 4/2007 | Speier et al. | 710/200 |
| 2007/0101333 | A1 | 5/2007 | Mewhinney et al. | 718/102 |

OTHER PUBLICATIONS

Kawachiya et al, "Lock Reservation: Java Locks Can Mostly Do Without Atomic Operations", ACM, 2002.*
Van Fleet, "Utilizing the Wait-List Anchor as a Lock," *IBM TDB*, vol. 39, No. 8, Aug. 1996, p. 173, "Optimized List Insertion for Lock Waiters," *IBM Research Discl.*, Apr. 1999, No. 42089, p. 529.

* cited by examiner

*Primary Examiner* — Jennifer To
*Assistant Examiner* — Brian Chew
(74) *Attorney, Agent, or Firm* — VanLeeuwen & VanLeeuwen; Matthew W. Baca

(57) ABSTRACT

An approach is provided that reserves a software lock for a waiting thread is presented. When a software lock is released by a first thread, a second thread that is waiting for the same resource controlled by the software lock is woken up. In addition, a reservation to the software lock is established for the second thread. After the reservation is established, if the lock is available and requested by a thread other than the second thread, the requesting thread is denied, added to the wait queue, and put to sleep. In addition, the reservation is cleared. After the reservation has been cleared, the lock will be granted to the next thread to request the lock.

9 Claims, 6 Drawing Sheets

OPTIMIZED PREEMPTION AND RESERVATION OF SOFTWARE LOCKS FOR WOKEN THREADS

RELATED APPLICATIONS

This application is a continuation application of U.S. Non-Provisional patent application Ser. No. 11/301,104, entitled "System and Method for Optimized Preemption and Reservation of Software Locks," filed on Dec. 12, 2005 now abandoned.

BACKGROUND OF THE INVENTION

1. Technical Field

The present invention relates in general to a system and method for improving software locks. More particularly, the present application relates to a system and method that reserves a software lock for threads that are waiting for the lock.

2. Description of the Related Art

In a multiprocessing environment, software locks are used to serialize access to resources. As used herein, a "thread" refers to a part of a program that can execute independently of other parts of the program. There can be multiple programs, including the operating system, operating at the same time, and each of these programs can have multiple threads. When a thread requires access to a serialized resource, a software lock is used. The software lock provides a mechanism so that one thread is able to use the resource (e.g., write to a shared memory location, etc.). While traditional locks provide a controlled means for accessing a resource, one challenge that is encountered using traditional locks is that a thread may be unintentionally starved for access to a particular resource. While this situation occurs in a multiprocessor environment, it may also occur in a uniprocessor environment under certain conditions.

FIG. 1 is a prior art depiction of a typical locking algorithm that potentially starves a process for a critical resource. In the example shown, the second thread is being starved for a particular resource. Depiction of a portion of the processing of the first thread commences at 100 and the depiction of a portion of the processing of the second thread commences at 101. At step 105, the first thread acquires a particular lock and then commences step 110 by performing work that utilizes the resource being controlled by the lock.

Sometime after the first thread has acquired the lock, but before the first thread has released the lock, the second thread requests the same software lock (step 115). At step 120, the lock manager notices that the lock is already taken (by the first thread), so, at step 125, the second thread is put to sleep and added to wait queue 130. Sometime after the second thread is put to sleep and added to the wait queue, the first thread releases the lock (step 135). The release of the lock by the first thread causes the second thread to wakeup (step 140) and the second thread is removed from wait queue 130. While the second thread is waking up, at step 145, the first thread performs work that does not require the shared resource that is being controlled by the software lock. However, before the second thread fully wakes up and requests the lock (step 160), the first thread once again needs to access the shared resource and requests the lock again at step 150. Because the lock was available and the first thread requested it before the second thread, at step 155 the first thread reacquires the lock.

Once again, the lock manager denies the lock to the second thread (step 165) because the lock has already been taken by another process (the first thread). The second thread is then put back to sleep and added to the wait queue (step 170). Unfortunately, the sequence may be repeated over and over again (step 175 and 180), thus starving the second thread so that it must wait an inordinate amount of time to acquire the shared resource being controlled by the lock. As mentioned before, while the situation described in FIG. 1 occurs in a multiprocessor environment, it may also occur in a uniprocessor environment under certain conditions. One reason that the second thread may become starved for the lock, as described above, is because the first thread is a running thread while the second thread is put to sleep. A running thread has an advantage over a sleeping thread in that it can often finish its processing and request the lock before the sleeping thread can wake up and request the lock. Using an affinity dispatcher, the second thread would be preferably dispatched to CPU 2 when it wakes up. However, if CPU 2 is busy, the second thread may be reassigned to a different CPU that is idle at the time that the second thread wakes up. Again, reassigning the second thread to an idle CPU requires additional time that provides the first thread with an additional advantage in finishing its work and re-requesting the lock.

What is needed, therefore, is a system and method that prevents one process from being starved for a shared resource. What is further needed is a system and method that reserves the lock for a waiting process so that it has a much better chance of acquiring the lock in a timely manner.

SUMMARY

It has been discovered that the aforementioned challenges are resolved by a system and method that reserves a software lock for a waiting process. When a software lock is released by a first process (thread), a second thread that is waiting for the same resource controlled by the software lock is woken up. In addition, a reservation to the software lock is established for the second thread.

After the reservation is established, if the lock is available and requested by a thread other than the second thread, the requesting thread is denied if its priority is not better than the second thread, and the requesting thread is added to the wait queue and put to sleep. In addition, the reservation is cleared. In this manner, if the second thread takes an inordinate amount of time to request the lock, the reservation does not permanently stand in the way of other processes (threads). After the reservation has been cleared, the lock will be granted to the next thread to request the lock. While the second thread is not guaranteed immediate acquisition of the lock, it does greatly improve the second thread's chances of acquiring the lock in a reasonable amount of time.

Of course, if the second thread is the next thread to request the lock after the reservation has been set (or if the second thread requests the lock before the reservation has been set), the second thread acquires the software lock. If a reservation had been set for the second thread, then the reservation is cleared.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
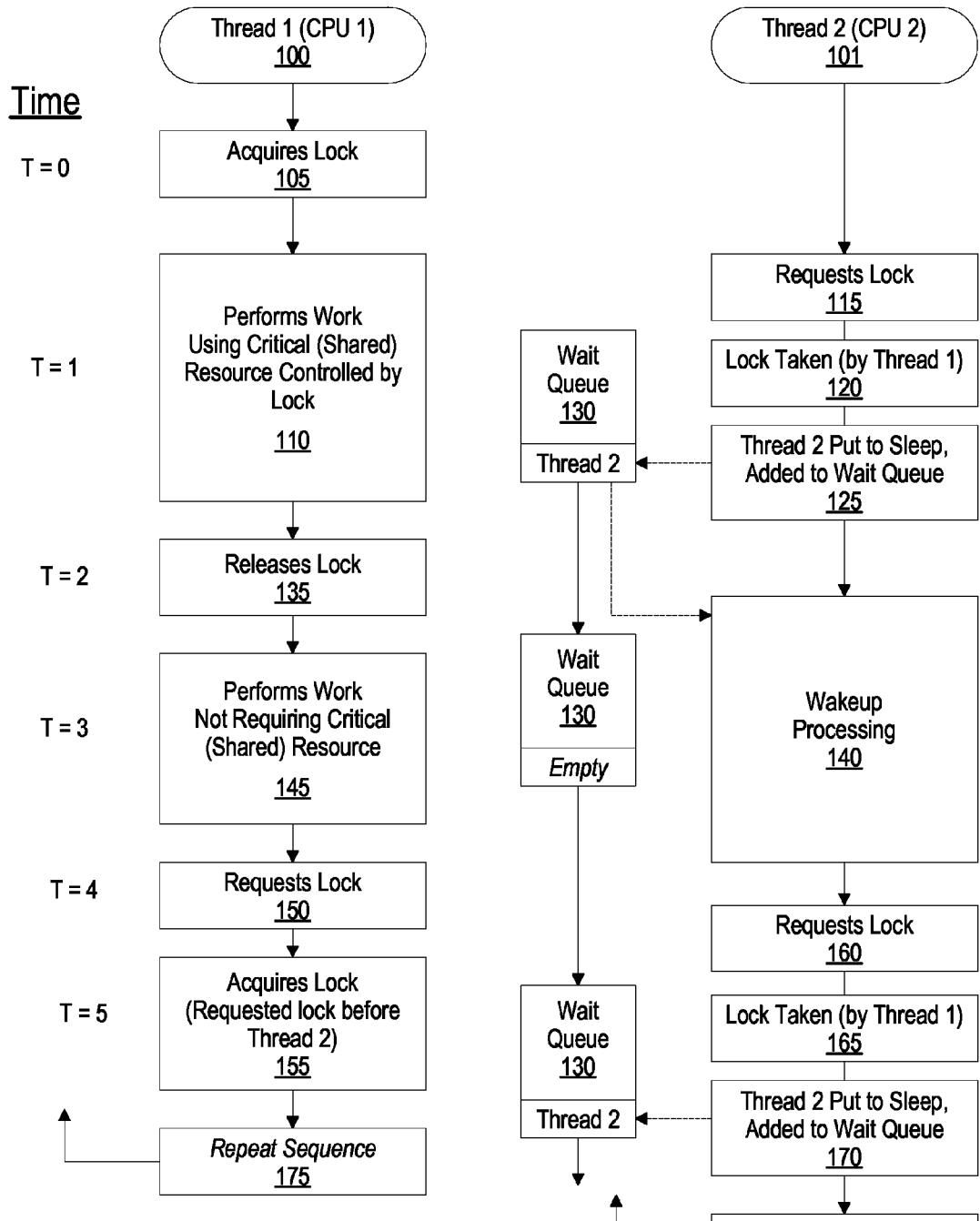
FIG. 1 is a prior art depiction of a typical locking algorithm that potentially starves a process for a critical resource.

FIG. 1 is a prior art depiction of a typical locking algorithm that potentially starves a process for a critical resource. The description for FIG. 1 can be found in the Background section, above.

FIGS. 2-5 show a locking algorithm that avoids starving a process for a critical resource. When a lock is released and there are waiters, the wake-up call sets a reservation bit in the lock structure. A thread woken from the waitlist (wait queue) will have a bit set in the thread control block that it was on the waitlist for the lock. The woken thread attempts to acquire the lock and will clear the waitlist bit. During the lock acquisition, if the lock is free and the lock structure has the waitlist bit set, a check will be made to see if the thread has the waitlist bit set. If the thread has the waitlist bit set, it will be allowed to attempt to take the lock and the thread waitlist bit will be cleared (irrespective of whether the lock is taken). If the thread does not have the waitlist bit set in its thread control structure, it will clear the lock reservation bit of the lock structure, will go to sleep, and it will be added to the waitlist (the wait queue).

A registration table can be used to determine which locks will use the algorithm described above and in FIGS. 2-5 or the algorithm can be applied to all locks. As the overhead for the algorithm is quite small, applying the algorithm to all locks is possible as the overhead involved in checking and setting reservation bit check is negligible, especially since the waitlist (wait queue) is being checked anyway. In addition, the extra dispatch overhead is also negligible and any small savings that may be accomplished by a more complex implementation would likely be outweighed by the additional overhead required by the complex implementation. In addition, efficiency can be further improved by storing the reservation bit in the same cache line as the lock itself. Furthermore, as explained in further detail herein, the lock reservation is only performed when a thread is waiting on the waitlist and is implemented as part of the wake-up routine.

Figure 2:
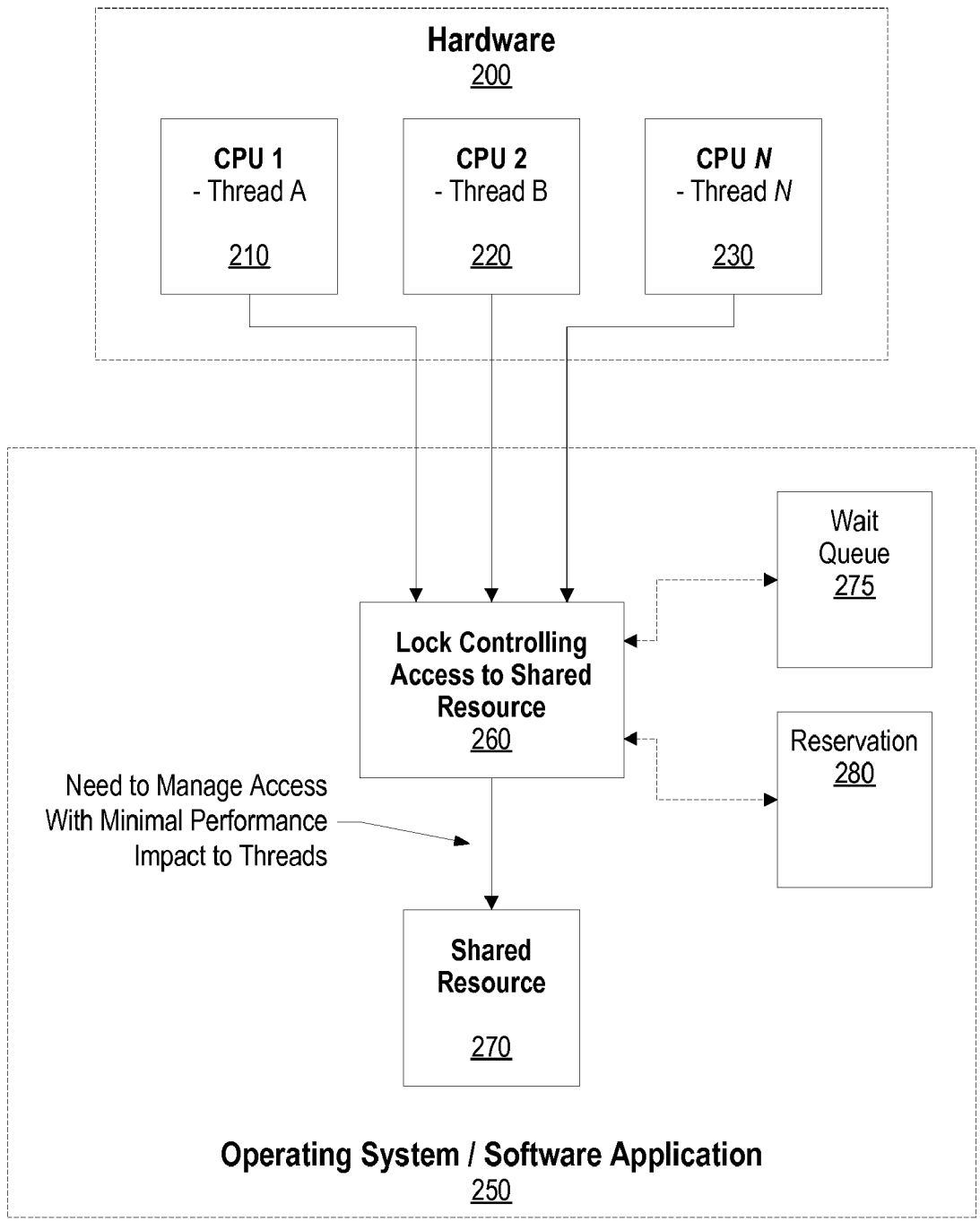
FIG. 2 is a high level diagram showing processes being executed by various processors and sharing a common resource through a software lock.

FIG. 2 is a high level diagram showing processes being executed by various processors and sharing a common resource through a software lock. The challenge described in the Background section (see FIG. 1 and description thereof, above) is more likely to occur in a multiprocessing system where different processors are used to execute different threads, each of which needs access to a shared resource. FIG. 2 depicts this multiprocessing environment.

Hardware 200 includes, among many components, multiple processors (CPU 1 (210), CPU 2 (220), and CPU 3 (230)). Each of the processors may be executing one or more threads. In the example shown, CPU 1 (210) is executing a first thread (Thread A), and CPU 2 (220) is executing a second thread (Thread B). These threads share various shared resources, access to which is controlled through one or more software locks.

Operating system or software application 250 manages access to shared resource 270 by using software lock 260. When the lock is acquired by one of the threads, then that thread can access and use shared resource 270. If the software lock has already been acquired by a first thread, then the requesting thread is added to wait queue 275. In one embodiment, wait queue 275 is a FIFO queue. More particularly, in this embodiment, threads with the same priority are sorted based on the order they arrived in the queue (FIFO). In this embodiment, higher priority threads are placed at the front of the queue and lower priority threads are placed at the end of the queue. When the first thread releases the lock, the first thread listed in wait queue 275 is woken up and a reservation is established for the woken up thread using reservation data structure 280. If another thread attempts to acquire the lock while the reservation is in place, the requesting thread is put to sleep and added to the wait queue. In one embodiment, after the other thread attempts to acquire the lock the reservation is cleared.

Figure 3:
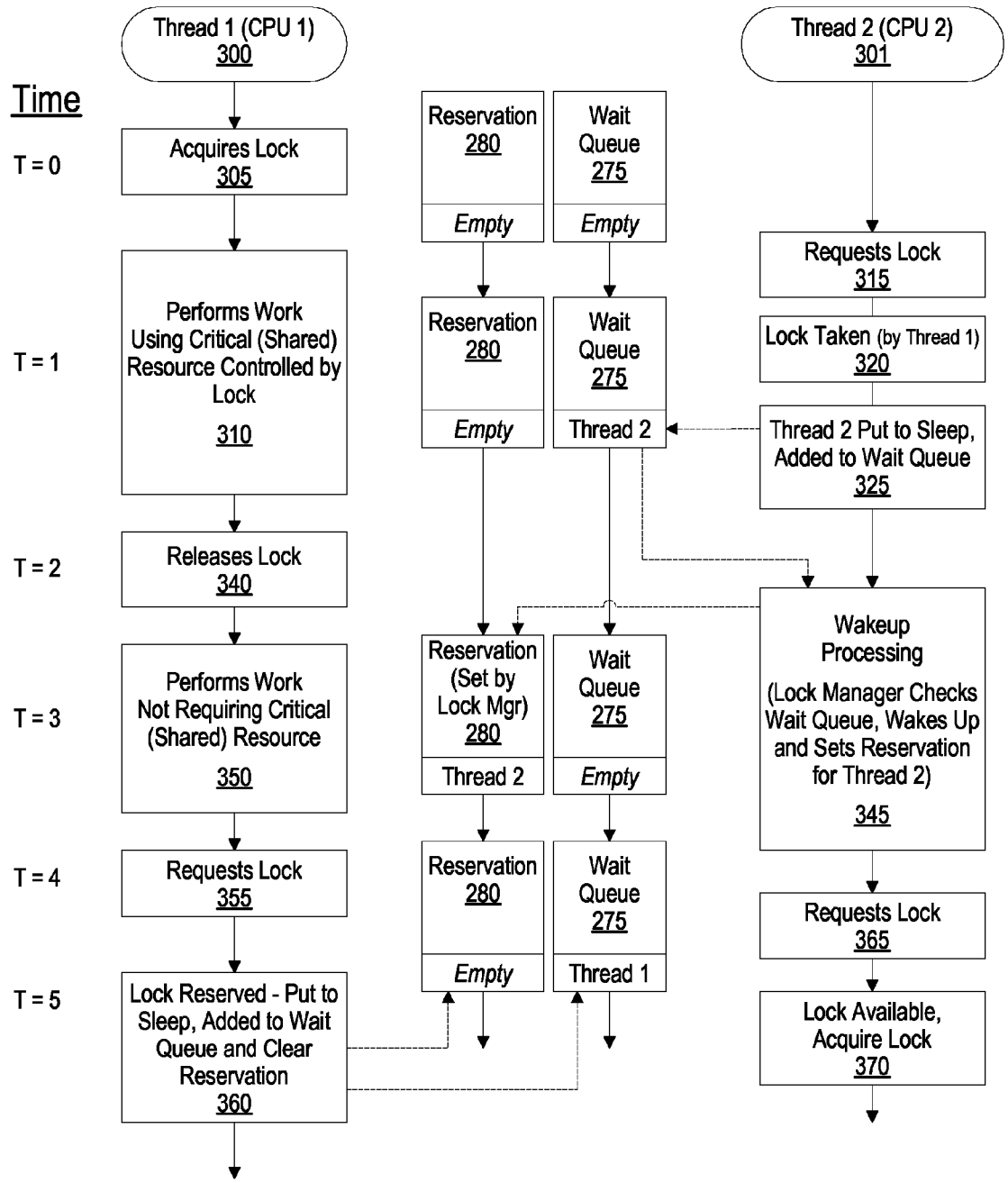
FIG. 3 is a diagram showing how the use of a reservation prevents starvation of the processes attempting use of the lock.

FIG. 3 is a diagram showing how the use of a reservation prevents starvation of the processes attempting use of the lock. A comparison between the processing shown in FIG. 3 and that shown in the prior art depiction shown in FIG. 1 reveals that the present invention reduces, or eliminates, starvation of a thread for a shared resource.

Depiction of a portion of the processing of a first thread commences at 300 and the depiction of a portion of the processing of a second thread commences at 301. At step 305, the first thread acquires a particular lock and then commences step 310 by performing work that utilizes the resource being controlled by the lock. Sometime after the first thread has acquired the lock but before the first thread has released the lock, the second thread requests the same software lock (step 315). At step 320, the lock manager notices that the lock is already taken (by the first thread), so, at step 325, the second thread is put to sleep and added to wait queue 275.

Sometime after the second thread is put to sleep and added to the wait queue, the first thread releases the lock (step 340). The release of the lock by the first thread causes the second thread to wakeup (step 345) and the second thread is removed from wait queue 275. In addition, the lock manager sets a reservation to the lock for the second thread. While the second thread is waking up, at step 350, the first thread performs work that does not require the shared resource being controlled by the software lock. However, before the second thread fully wakes up and requests the lock (step 365), the first thread once again needs to access the shared resource and requests the lock again at step 355. However, even though the lock is available, the lock manager notices that a reservation has been set for the lock for another thread. The lock manager compares the thread identifier of the first thread (the thread making the request) with the thread identifier stored in reservation 280 (set for the second thread). Since the two thread identifiers do not match, the first thread is put to sleep, added to the wait queue, and the reservation is cleared (step 360). Now, when the second thread wakes up and requests the lock at step 365, the lock is still available and the second thread is able to acquire the lock at step 370. Likewise, when the second thread releases the lock, a reservation will be established for the first thread as it is sleeping and waiting in the wait queue, giving the first thread a better opportunity to acquire the lock.

Figure 4:
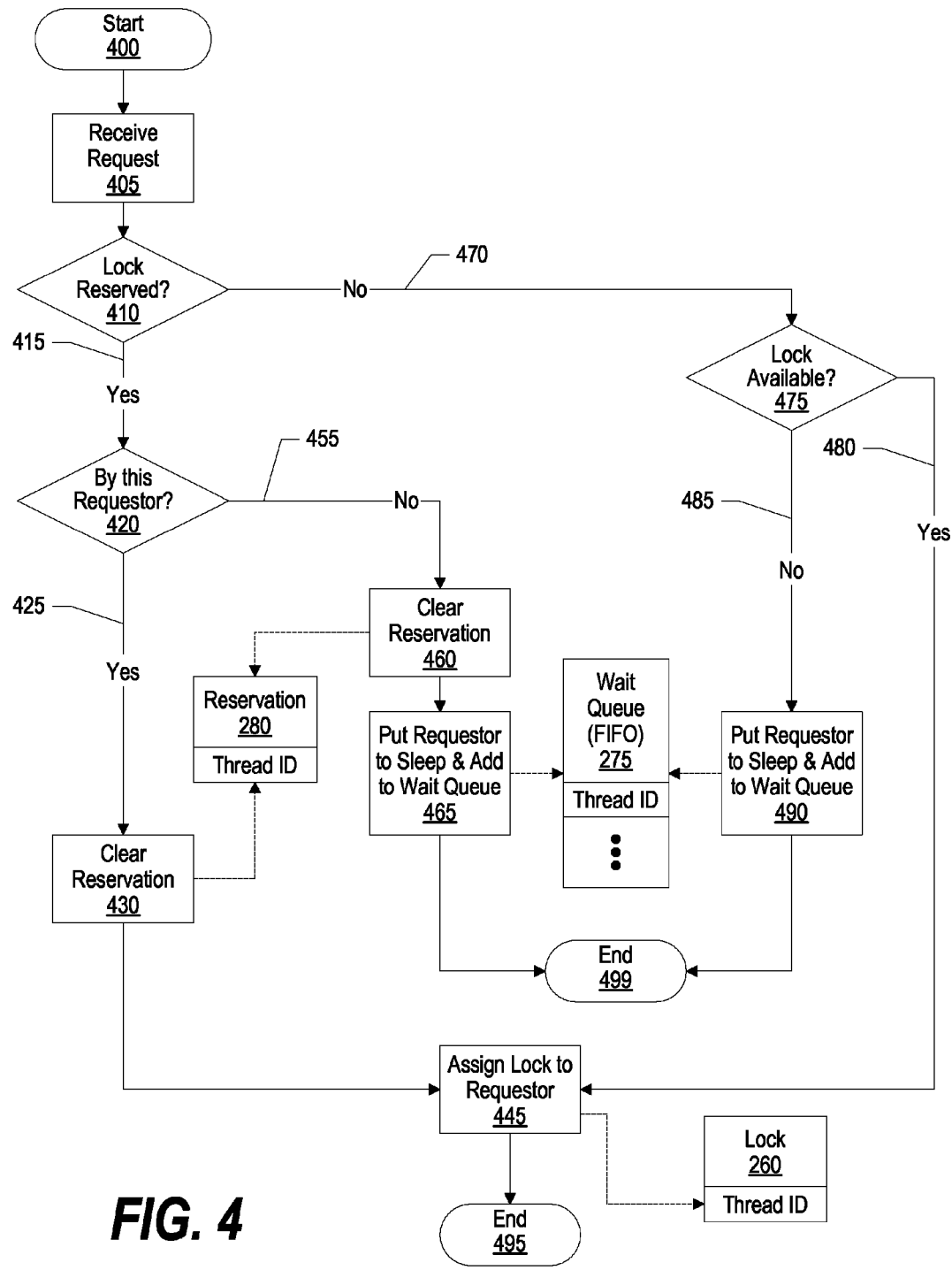
FIG. 4 is a flowchart showing the steps taken when a request for a lock is received.

FIG. 4 is a flowchart showing the steps taken when a request for a lock is received. Processing commences at 400 whereupon, at step 405, a request for a lock is received. A determination is made as to whether the requested lock is reserved (decision 410). If the requested lock is reserved, decision 410 branches to "yes" branch 415 whereupon another determination is made as to whether the lock is reserved by the requesting thread (decision 420). This determination is made by comparing the requesting thread's identifier to the thread identifier corresponding to reservation 280. If the lock is reserved by the requesting thread, then decision 420 branches to "yes" branch 425 whereupon, at step 430, reservation 280 is cleared and the lock is acquired by the requester at step 445 by writing the requestor's thread identifier to lock data structure 260 before the depicted processing ends at 495.

Returning to decision 420, if the lock is reserved but not by the requesting thread, then decision 420 branches to "no" branch 455 whereupon, at step 460, reservation 280 is cleared, the requesting thread is put to sleep and added to wait queue 275 before the depicted processing ends at 499. Returning to decision 410, if the lock is not reserved, decision 410 branches to "no" branch 470 whereupon another determination is made as to whether the lock is currently available (decision 475). If the lock is currently available, decision 475 branches to "yes" branch 480 whereupon, the lock is acquired by the requester at step 445 by writing the requestor's thread identifier to lock data structure 260 before the depicted processing ends at 495. On the other hand, if the lock is not currently available, decision 475 branches to "no" branch 485 whereupon, at step 490 the requester is put to sleep and added to wait queue 275 before the depicted processing ends at 499.

Figure 5:
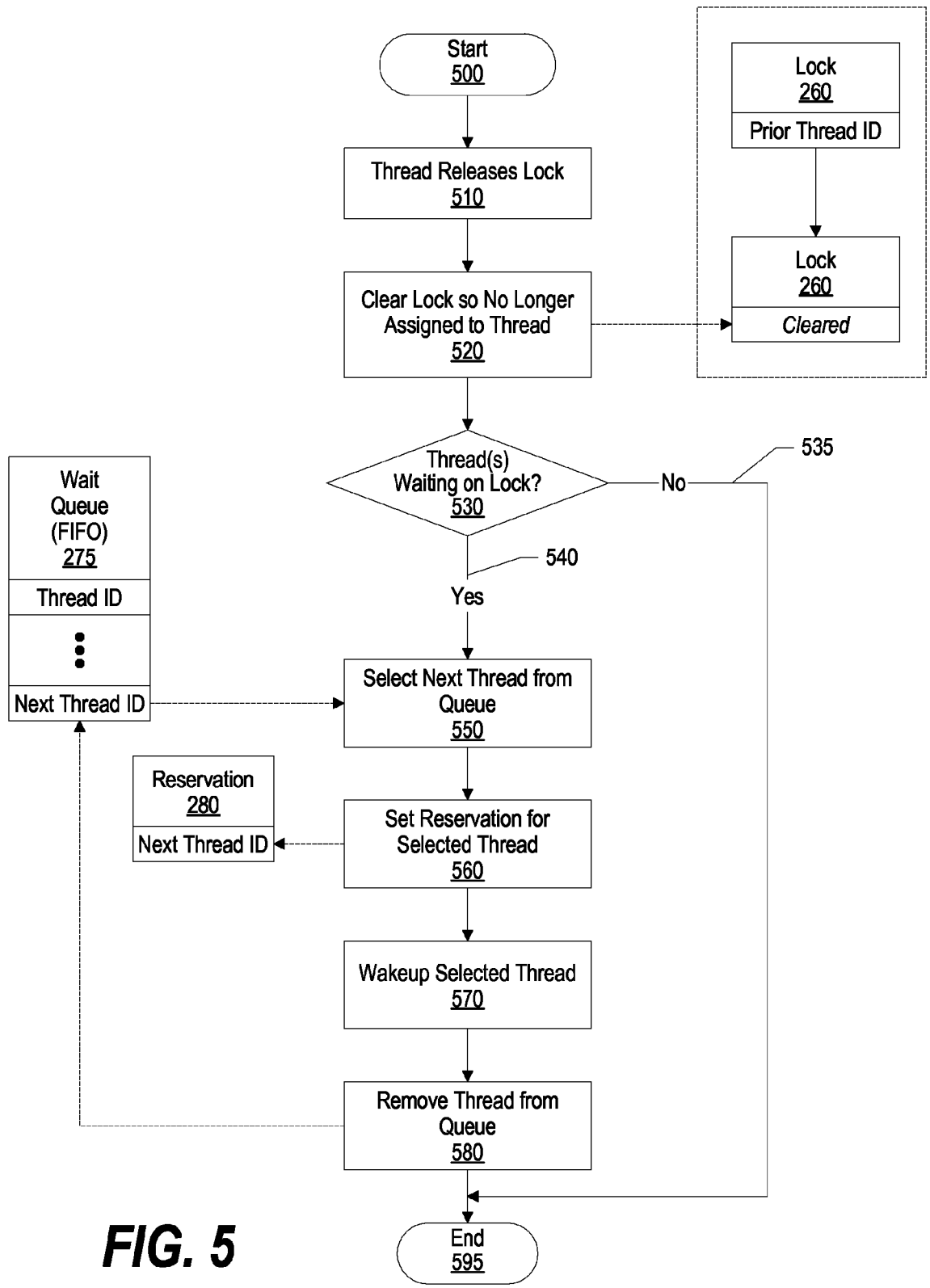
FIG. 5 is a flowchart showing the steps taken when a process holding the lock releases the lock.

FIG. 5 is a flowchart showing the steps taken when a thread holding a lock releases the lock. Processing commences at 500 whereupon, at step 510, a first thread that was holding lock 260 releases the lock. At step 520, lock 260 is cleared so that is no longer assigned to the thread.

A determination is made as to whether there are one or more threads in wait queue 275 that are waiting for the lock (decision 530). If there are no threads waiting on the lock, decision 530 branches to "no" branch 535 bypassing the remaining steps and processing ends at 595. On the other hand, if one or more threads are waiting on the lock, decision 530 branches to "yes" branch 540 whereupon, at step 550, the next thread listed in wait queue 275 is selected. At step 560, a reservation is set for the selected thread by writing the selected thread's identifier to reservation data structure 280. At step 570, the selected thread is woken up, and at step 580 the selected thread is removed from wait queue 275. Processing thereafter ends at 595.

Figure 6:
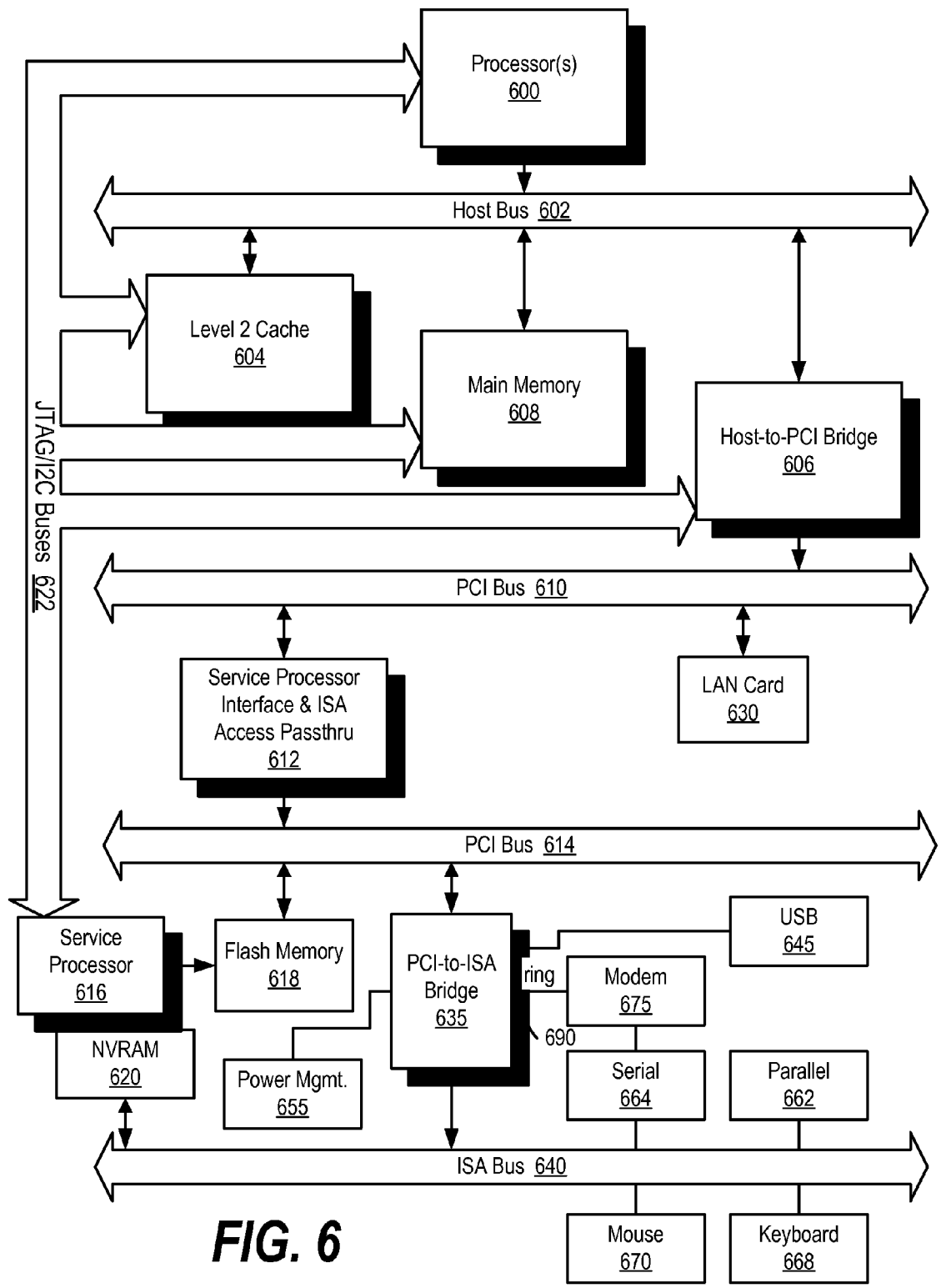
FIG. 6 illustrates information handling system 701 which is a simplified example of a computer system capable of performing the computing operations described herein.

FIG. 6 illustrates information handling system 601 which is a simplified example of a computer system capable of performing the computing operations described herein. Computer system 601 includes processor 600 which is coupled to host bus 602. A level two (L2) cache memory 604 is also coupled to host bus 602. Host-to-PCI bridge 606 is coupled to main memory 608, includes cache memory and main memory control functions, and provides bus control to handle transfers among PCI bus 610, processor 600, L2 cache 604, main memory 608, and host bus 602. Main memory 608 is coupled to Host-to-PCI bridge 606 as well as host bus 602. Devices used solely by host processor(s) 600, such as LAN card 630, are coupled to PCI bus 610. Service Processor Interface and ISA Access Pass-through 612 provides an interface between PCI bus 610 and PCI bus 614. In this manner, PCI bus 614 is insulated from PCI bus 610. Devices, such as flash memory 618, are coupled to PCI bus 614. In one implementation, flash memory 618 includes BIOS code that incorporates the necessary processor executable code for a variety of low-level system functions and system boot functions.

PCI bus 614 provides an interface for a variety of devices that are shared by host processor(s) 600 and Service Processor 616 including, for example, flash memory 618. PCI-to-ISA bridge 635 provides bus control to handle transfers between PCI bus 614 and ISA bus 640, universal serial bus (USB) functionality 645, power management functionality 655, and can include other functional elements not shown, such as a real-time clock (RTC), DMA control, interrupt support, and system management bus support. Nonvolatile RAM 620 is attached to ISA Bus 640. Service Processor 616 includes JTAG and I2C busses 622 for communication with processor(s) 600 during initialization steps. JTAG/I2C busses 622 are also coupled to L2 cache 604, Host-to-PCI bridge 606, and main memory 608 providing a communications path between the processor, the Service Processor, the L2 cache, the Host-to-PCI bridge, and the main memory. Service Processor 616 also has access to system power resources for powering down information handling device 601.

Peripheral devices and input/output (I/O) devices can be attached to various interfaces (e.g., parallel interface 662, serial interface 664, keyboard interface 668, and mouse interface 670 coupled to ISA bus 640. Alternatively, many I/O devices can be accommodated by a super I/O controller (not shown) attached to ISA bus 640.

In order to attach computer system 601 to another computer system to copy files over a network, LAN card 630 is coupled to PCI bus 610. Similarly, to connect computer system 601 to an ISP to connect to the Internet using a telephone line connection, modem 675 is connected to serial port 664 and PCI-to-ISA Bridge 635.

While the computer system described in FIG. 6 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   releasing a software lock by a first thread, wherein the releasing results in the software lock being available;
   identifying a second thread waiting on the software lock at the time of the releasing;
   establishing a reservation to the software lock by the second thread in response to the identifying;
   waking the second thread in response to the releasing;
   after the establishment of the reservation and before the second thread acquires the software lock has been taken by the second thread, receiving a first request for the software lock by a first requesting thread that is not the second thread;
   in response to receiving the first request, determining a reservation status for the software lock;
   in response to determining that the software lock is reserved for the second thread, denying the first request and putting the first requesting thread to sleep, wherein denying the first request and putting the first requesting thread to sleep are performed while the software lock is available;
   clearing the reservation in response to receiving the first request;
   after the clearing and before the second thread acquires the software lock, receiving a second request for the software lock by a second requesting thread; and
   in response to the second requesting thread not being the second thread, allowing the second requesting thread to acquire the software lock in response to the second request.

2. The method of claim 1 further comprising:
   in response to the second requesting thread being the second thread, allowing the second thread to acquire the software lock; and
   clearing the reservation in response to receiving the second request.

3. The method of claim 1 further comprising:
   selecting a thread identifier corresponding to the second thread from a wait queue, wherein the wait queue includes one or more thread identifiers corresponding to threads waiting for the software lock; and
   removing the selected thread identifier from the wait queue.

4. An information handling system comprising:
   one or more processors;
   a memory accessible by the processors;
   a plurality of threads, including a first thread and a second thread, stored in the memory and executed by the processors;
   a software lock that controls access to a resource; and
   a set of instructions executed by the processors to perform actions of:
   releasing the software lock by the first thread, wherein the releasing results in the software lock being available;
   identifying a second thread waiting on the software lock at the time of the releasing;
   establishing a reservation to the software lock by the second thread in response to the identifying;
   waking the software lock in response to the identifying;
   after the establishment of the reservation and before the second thread acquires the software lock, receiving a first request for the software lock by a first requesting thread that is not the second thread;
   in response to receiving the first request, determining a reservation status for the software lock; and
   in response to determining that the software lock is reserved for the second thread, denying the first request and putting the first requesting thread to sleep, wherein denying the first request and putting the first requesting thread to sleep are performed while the software lock is available;
   clearing the reservation in response to receiving the first request;
   after the clearing and before the second thread acquires the software lock, receiving a second request for the software lock by a second requesting thread; and
   in response to the second requesting thread not being the second thread, allowing the second requesting thread to acquire the software lock in response to the second request.

5. The information handling system of claim 4 further comprising:
   in response to the second requesting thread being the second thread, allowing the second thread to acquire the software lock; and
   clearing the reservation in response to receiving the second request.

6. The information handling system of claim 4 further comprising:
   selecting a thread identifier corresponding to the second thread from a wait queue, wherein the wait queue includes one or more thread identifiers corresponding to threads waiting for the software lock; and
   removing the selected thread identifier from the wait queue.

7. A computer program product in a computer-readable storage medium comprising functional descriptive material that, when executed by a computer, directs the computer to perform actions of:
   releasing a software lock by a first thread, wherein the releasing results in the software lock being available;
   identifying a second thread waiting on the software lock at the time of the releasing;
   establishing a reservation to the software lock by the second thread in response to the identifying;
   waking the software lock in response to the identifying;
   after the establishment of the reservation and before the second thread acquires the software lock has been taken by the second thread, receiving a first request for the software lock by a first requesting thread that is not the second thread;

in response to receiving the first request, determining a reservation status for the software lock; and in response to determining that the software lock is reserved for the second thread, denying the first request and putting the first requesting thread to sleep, wherein denying the first request and putting the first requesting thread to sleep are performed while the software lock is available;

clearing the reservation in response to receiving the first request;

after the clearing and before the second thread acquires the software lock, receiving a second request for the software lock by a second requesting thread; and in response to the second requesting thread not being the second thread, allowing the second requesting thread to acquire the software lock in response to the second request.

8. The computer program product of claim 7 further comprising:

in response to the second requesting thread being the second thread, allowing the second thread to acquire the software lock; and clearing the reservation in response to receiving the second request.

9. The computer program product of claim 7 further comprising:

selecting a thread identifier corresponding to the second thread from a wait queue, wherein the wait queue includes one or more thread identifiers corresponding to threads waiting for the software lock; and removing the selected thread identifier from the wait queue.

* * * * *